July 31, 1928.
R. SCHOLZ
1,678,747
DOUGH KNEADING MACHINE FOR THE PRODUCTION
OF DOUGH PORTIONS READY FOR BAKING
Filed Jan. 25, 1927    3 Sheets-Sheet 1
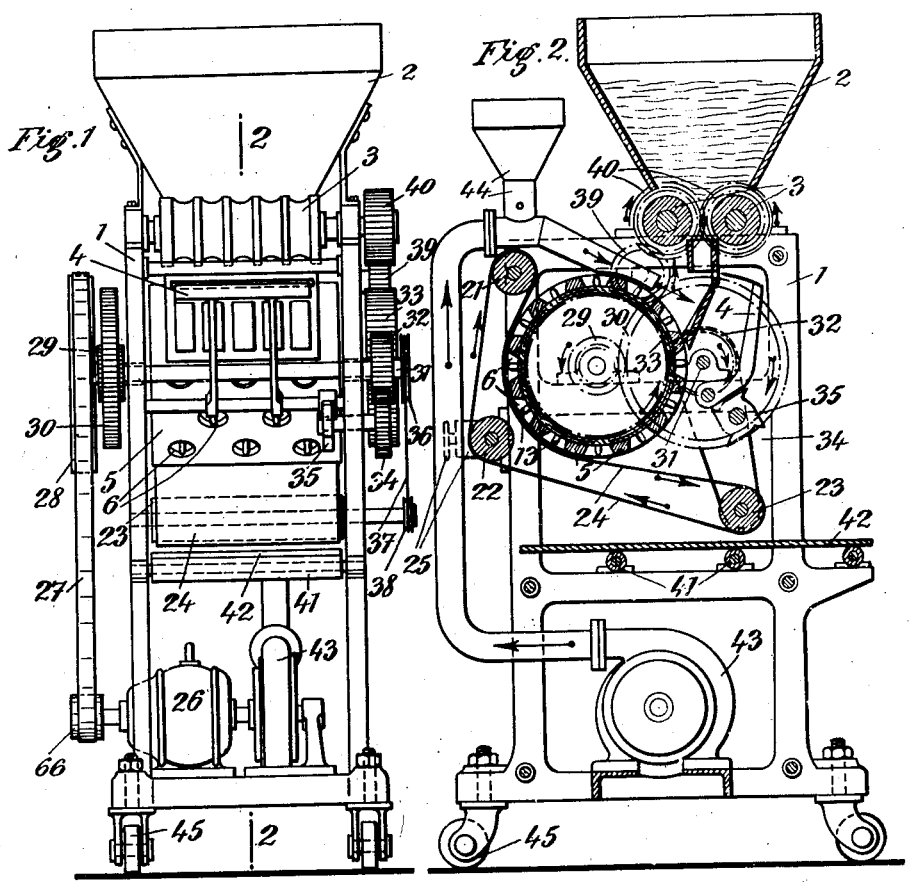

July 31, 1928.
R. SCHOLZ
DOUGH KNEADING MACHINE FOR THE PRODUCTION
OF DOUGH PORTIONS READY FOR BAKING
Filed Jan. 25, 1927   3 Sheets-Sheet 2
1,678,747
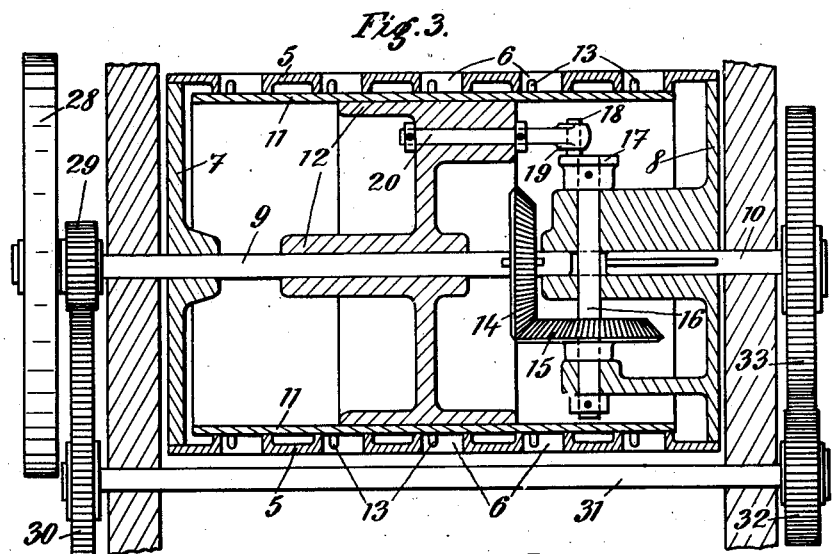
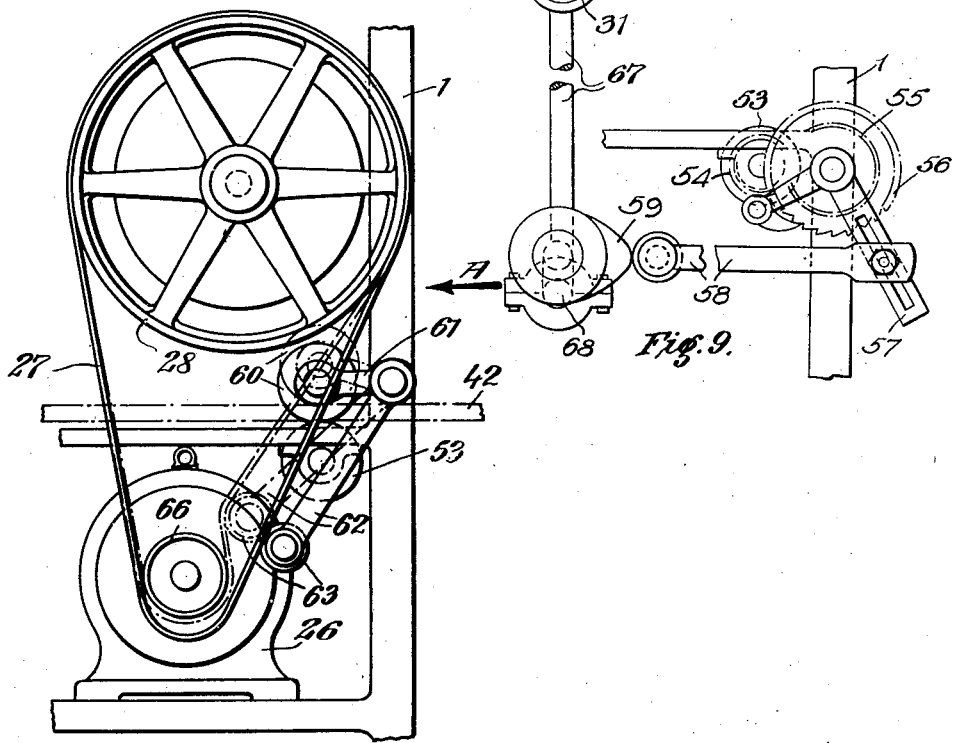

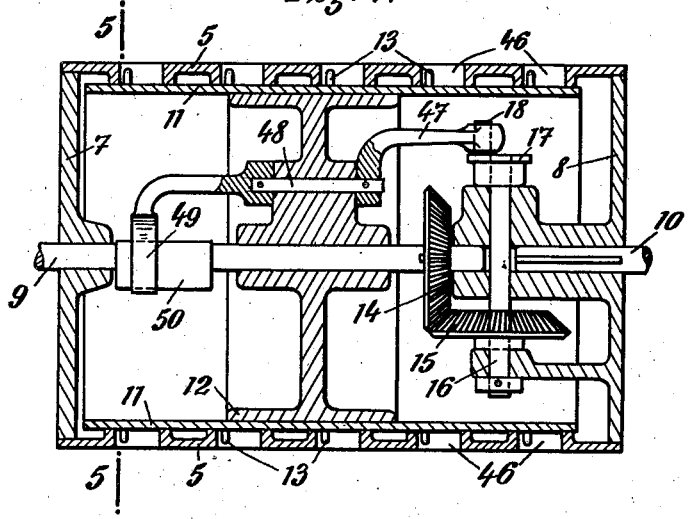
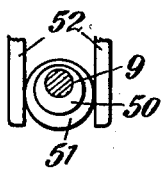
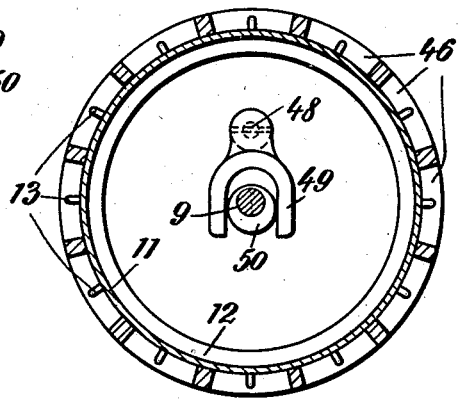
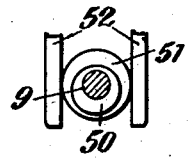

Patented July 31, 1928.

1,678,747

UNITED STATES PATENT OFFICE.

RICHARD SCHOLZ, OF BERLIN, GERMANY, ASSIGNOR TO THE FIRM: W. MARX & CO., OF HALLE-ON-THE-SAALE, GERMANY.

DOUGH-KNEADING MACHINE FOR THE PRODUCTION OF DOUGH PORTIONS READY FOR BAKING.

Application filed January 25, 1927, Serial No. 163,444, and in Germany March 16, 1925.

This invention relates to a dough kneading machine for the production of dough portions ready for baking and it is characterized in that in a horizontal hollow cylinder apertures, displaced the one with regard to the others, are arranged to which, the cylinder rotating slowly, the dough portions which have been cut off by a suitable mechanism are fed continuously and kneaded and shaped by means of fingers which rapidly circulate in these apertures or execute in the same any other suitable movement, the dough portions being subsequently deposited on a baking tin by means of a conveying band. The fingers are fixed on a cylinder which is arranged in the hollow cylinder and covers from the inner side the apertures in said hollow cylinder so that the dough portions are held in said apertures. When rotating the hollow cylinder rotates slowly the inner cylinder by acting upon the fingers on the cylinder. This inner cylinder, which is loosely mounted on its shaft is oscillated, through the intermediary of a convenient device, for instance an eccentric acting at the side of the longitudinal shaft of said inner cylinder, so that the fingers execute rapidly the desired movements in the apertures and effect consequently an intensive kneading of the dough portions in the apertures. The conveying band encloses that part of the hollow cylinder from the apertures in which the dough portions might drop out, the conveying band exerting an elastic counter-pressure upon these dough portions. In order to regulate the pressure exerted by the conveying band upon the cylinder, the conveying band is connected to a tensioning device of known type.

On the machine a mechanism for engaging and disengaging the driving gear is arranged, which is controlled by the inserting and removing of the baking tin. With this object in view a cylinder is oscillatably mounted on the cylinder which is at the entrance side of the machine said latter cylinder being rotated from the main driving gear and effecting at the same time the conveying of the baking tin, said oscillatable cylinder yielding in upward direction at the insertion of the baking tin and stretching through the intermediary of a roller the driving belt of the electromotor, whereby the main driving gear for the machine is engaged.

When the baking tin with the dough portions is being removed from the machine the oscillatably mounted cylinder drops back upon the conveying cylinder of the baking tin, the stretching roller releasing at the same time the driving belt so that the main driving gear of the machine is disengaged. Owing to this arrangement the kneading and shaping of the dough portions and the delivering of the same is instantaneously interrupted when the charged baking-tin is being removed from the machine so that no finished dough portions can drop into the machine. This engaging and disengaging mechanism presents the further advantage, that an attendant can interchange the baking tin, i. e. insert a fresh baking tin into the machine in engaging at the same time the driving gear of the machine. The machine presents the advantage that dough portions can be produced ready for the baking-oven in continuous succession and thoroughly kneaded whereby on the one hand the baking process is considerably accelerated and on the other hand bakers' ware of better quality is produced than hitherto.

According to the kind of the bakers' ware to be produced, for instance for shaping round bakers' ware, the circulating fingers may be omitted, so that to the dough portions in the apertures of the hollow cylinder continuous circulating movements are communicated from the inner cylinder, the portions being kneaded as well as shaped.

An embodiment of the invention is shown, by way of example, in the accompanying drawings, in which Fig. 1 shows a front elevation of the machine.

Fig. 2 is a section on line 2—2 of Fig. 1.

Fig. 3 shows the kneading and shaping mechanism in section on a larger scale.

Fig. 4 is a similar view showing a modified form of construction of the kneading and shaping mechanism.

Fig. 5 is a section on line 5—5 of Fig. 4.

Figs. 6 and 7 illustrate another driving means for the kneading and shaping mechanism.

Fig. 8 shows in side elevation on larger scale the engaging and disengaging mechanism for the main driving gear of the machine as shown in Figs. 1 and 2 but looking at the opposite side of the machine.

Fig. 9 shows in side elevation on larger scale the corresponding feeding mechanism for the baking tin also indicated in Fig. 1.

On the machine frame 1 a dough reservoir 2 and fluted rolls 3 are arranged and below the rolls a mechanism 4 for cutting dough-portions from the dough. The inclined guide plane of the cutting mechanism 4 ends at the side over a horizontally mounted hollow cylinder 5, which has in its circumference a number of circular apertures 6 which are displaced the one with regard to the others. The hollow cylinder 5 is closed at either end by a plate 7, 8 respectively, said plates serving as bearings for the hollow cylinder and for shafts 9 and 10. The shaft 9 is loosely mounted in the bearings of the end plates 7 and 8, the shaft 10 being keyed into the bearing of the end plate 8 so that, when it is rotating, the hollow cylinder 5 is rotated also. On the shaft 9 a cylinder 11 open at both ends is loosely mounted by means of a sleeve 12, said cylinder being designed to cover from the inner side the apertures 6 of the hollow cylinder 5. On the outer side of the cylinder 11 fingers 13 are fixed which project into the apertures 6. On the inner end of the loosely mounted shaft 9 a bevel wheel 14 is keyed which meshes with a bevel wheel 15, the axle 16 of which stands perpendicularly to the shafts 9 and 10 and is journalled in the bearing of the end plate 8. On the free end of this axle 16 a flanged disk 17 is keyed, which carries an eccentric, upwardly directed pin 18 loosely engaging with the lug 19 of a bolt 20 which is fixed in the sleeve 12 eccentrically with regard to the shaft 9. The hollow cylinder 5 is enclosed, as can be seen from Fig. 2, on a portion of its circumference over its entire length, by an endless conveying band 24 guided over pulleys 21, 22 and 23. On the pulley 22 a stretching device 25 is mounted, so that the pressure of the conveying band 24 onto the hollow cylinder 5 can be regulated at will.

The operation of the kneading machine is as follows:—

From the electro-motor 26 a belt pulley 28 keyed on shaft 9 is driven by means of a belt 27, so that the shaft 9 rotates loosely in the end plate 7 in rotating also the bevel wheel 14. This bevel wheel 14 drives the bevel wheel 15 with axle 16 and flange disk 17, so that the pin 18 executes a circulating movement and pulls along the bolt 20. As the bolt 20 is rigid in the sleeve 12 in the cylinder 11, this cylinder must carry out the same circulating movements as the eccentric pin 18 so that the fingers 13 circulate permanently in the apertures 6. On the shaft 9, at the side of the belt pulley 28, a pinion 29 is keyed which meshes with a spur wheel 30, the shaft 31 of which extends along the hollow cylinder 5 on the outer side of the same and carries at its other end a pinion 32 meshing with a spur wheel 33 keyed on the shaft 10. As the shaft 10 is rigid with the end plate 8 of the hollow cylinder 5, this cylinder 5 is rotated independently of the movement of cylinder 11 and draws this cylinder 11 along by acting upon the fingers 13. As the ratio of transmission between the pinion 29, toothed wheel 30, pinion 32 and toothed wheel 33 is selected in such a manner that the number of revolutions of the spur wheel 33 is considerably lower than that of the spur wheel 29, the hollow cylinder 5 with the cylinder 11 rotate only very slowly, whilst the fingers 13 of cylinder 11 driven directly from the belt pulley 28 circulate very rapidly in the apertures 6.

With the pinion 32 meshes a spur wheel 34 which drives a cam disk 35 for operating the knife for the dough cutting mechanism 4. On the shaft 31 there is further keyed a cord pulley 36 the cord 37 of which drives a grooved disk 38 for the cylinder 23 of the conveying band 24. The spur wheel drives further through the intermediary of a pinion 39 the spur wheels 40 of the fluted rolls 3 so that all the elements to be operated are rotated accordingly from the electromotor 26 and can carry out their functions.

When the electromotor 26 is being started, the rotating fluted rolls 3 form strings of the dough coming from the reservoir 2, said dough strings being cut into portions of uniform length by the dough cutting mechanism 4, said dough portion being then fed to the kneading and shaping cylinder 5. One dough portion is fed into each aperture 6 of the cylinder 5 and is well kneaded and shaped in this aperture by the circulating fingers 13. As soon as the dough portions, when rotation of cylinder 5 continues, begin the downward travel they are held by the conveying band 24, which is in contact with the hollow cylinder, in the apertures 6 until the conveying band moves away from the hollow cylinder to pass around the pulley 23. The kneaded and shaped dough portions drop then onto the conveying band 24 and are conveyed by this band and delivered onto the baking tin 42 resting on rollers 41. The baking tin may be shifted by hand or mechanically so that the dough portions are placed on the baking tin in successive rows.

In order to ensure that the dough portions do not stick in the apertures 6 of cylinder 5 nor on the cutting mechanism, means are provided for blowing flour upon these elements. The flour coming from a flour reservoir 44 and dropping into a blow pipe is blown upon the corresponding elements of the machine by an air current from a fan 43.

Rollers 45 in the feet of the frame serve for facilitating the transport of the machine.

According to Figs. 4 and 5 the apertures 46 of the hollow cylinder 5 are oval, the fingers 13 projecting into these apertures. The catch rod 47 the outer end of which is placed over the eccentric pin 18 is fixed at the inner end on a horizontal rod 48 mounted in the sleeve 12 of cylinder 11, so that this inner cylinder 11 executes the same movements as described with reference to and shown in Figs. 2 and 3, as soon as the driving gear is engaged. On the other end of rod 48 a fork 49 is fixed which loosely embraces an eccentric element 50 keyed on shaft 9.

As soon as shaft 9 rotates the bevel wheels 14 and 15 for driving the eccentric pin 18, the fingers begin to circulate in the apertures 46. The shaft 9 rotates at the same time the eccentric element 50 so that the fork 49 executes eccentric-like movements which through the intermediary of sleeves 12 are transmitted upon the inner cylinder 11 and consequently upon the fingers 13 of the same. These fingers 13 execute therefore in the oval apertures 46 oval movements as the eccentric element 50 makes the fork 49 alternately oscillate as soon as the eccentric pin 18 has conducted the fingers 13 over the shortest diameter of the oval apertures 46. At this moment the eccentric element produces the oscillating movements of the fingers 13 over the greatest diameter of the oval apertures 46 so that by this double driving mechanism the fingers 13 travel in the apertures 46 along an oval path.

As shown in Figs. 6 and 7 an eccentric ring 51 is mounted on the eccentric element 50 so that, if this ring 51 is brought from the position shown in Fig. 6 into the position shown in Fig. 7, the whole element will execute circulating movements in the fork 52, whilst by suitable adjusting between the two extreme positions shown in Figs. 6 and 7, this eccentric element 50, 51 influences the fork 52 more or less.

In the machine frame 1 a cylinder 53 is rotatably mounted in bearings in the direction of the movement of the baking tin underneath the conveying band. The cylinder 53 is at the entrance side A and carries at its side a pinion 54 meshing with a spur wheel 55 which is rotated by a ratchet wheel 56 and pawl lever 57 so that by its rotation the cylinder 53 is rotated also. The pawl lever 57 is operated by a connecting rod 58, adjustably fixed on said pawl lever and controlled by a cam lever 59 from the main driving gear of the machine. According to the position of the connecting rod 58 on the pawl lever 57 the cylinder 53 is rotated at higher or lower speed. Above the cylinder 53 a cylinder 60 is arranged which is journalled in an oscillatable lever 61 and rests upon said cylinder 53. To the end of this lever 61 a lever 62 is fixed which carries at its lower end an easily rotatable roller 63 which is situated on the path of the driving belt 27 which connects the electromotor 26 with the belt pulley 28 of the machine. The cam 59 is operated by a crank-shaft 68 which by an eccentric rod 67 is connected to a machine-shaft 31. Any other driving element might be substituted for the connecting rod 58 or for the cam-disk 59.

The operation is as follows:—

When no baking tin is in the machine, the cylinder 60 rests upon the cylinder 53, the roller 63 on lever 62 touching the driving belt 27 quite loosely. As in this position of the roller 63 the belt is so loosely held that it drops in downward direction, the pully 66 of the electromotor cannot operate the belt so that the belt pulley 28 remains at rest. When a baking tin 42 is inserted between the cylinders 53 and 60 the cylinder 60 is raised and the levers 61, 62 are oscillated so that the roller 63 is strongly pressed against the belt 27 and stretches the same so that it is drawn along by the pulley 66 of the electromotor and rotates the belt pulley 28 (Fig. 1 dash and dot lines). As the cylinder 53 is rotated by the driving mechanism shown in Fig. 9 and as by the tension of the belt the cylinder 60 is pressed upon the baking tin which in its turn is pressed upon the cylinder 53, the cylinder 60 slowly advances the baking tin 42 so that the conveying band 24 can deposit the dough portions continuously upon said baking tin. When the outer end of the baking tin 42 has passed through between the two cylinders 53 and 60 the cylinder 60 descends so that the roller 63 is oscillated in outward direction, whereby the belt 27 gets slack and the kneading and shaping machine is stopped to be started again only when a fresh baking tin is inserted between the cylinders 53 and 60.

I claim:—

1. A dough cutting, kneading and shaping machine, comprising in combination a horizontal hollow cylinder having apertures in its circumference which are displaced the one with regard to the other, a cylinder in said hollow cylinder designed to cover said apertures from the inner side, fingers on said inner cylinder engaging each into one of the apertures of said hollow cylinder, means for slowly rotating said hollow cylinder, and means for communicating to said inner cylinder which rotates with said hollow cylinder a rapid reciprocating movement so that said fingers circulate in said apertures and knead and shape the dough portions held in said apertures.

2. A dough cutting, kneading and shaping machine, comprising in combination a horizontal hollow cylinder having apertures in its circumference which are displaced the one with regard to the other, a central shaft in said hollow cylinder, a cylinder loosely mounted on said shaft and designed to cover said apertures from the inner side, fingers on said inner cylinder engaging each into one of the apertures of said hollow cylinder, means for slowly rotating said hollow cylinder, and means for communicating to said inner cylinder which rotates with said hollow cylinder a rapid reciprocating movement so that said fingers circulate in said apertures and knead and shape the dough portions held in said apertures.

3. A dough cutting, kneading and shaping machine, comprising in combination a horizontal hollow cylinder having apertures in its circumference which are displaced the one with regard to the others, a central shaft in said hollow cylinder, a cylinder loosely mounted on said shaft and designed to cover said apertures from the inner side, fingers on said inner cylinder engaging each into one of the apertures of said hollow cylinder, means for slowly rotating said hollow cylinder, a bevel wheel on the inner end of said shaft, a bevel wheel meshing with said first mentioned bevel wheel, an axle of said second mentioned bevel wheel perpendicular to said shaft, a flanged disk at the top end of said axle, a pin eccentrically fixed in and upwardly projecting from said flanged disk a sleeve forming the hub of said inner cylinder, a horizontal stud eccentrically fixed in and projecting from said sleeve and having a lug at its projecting end said lug engaging over said eccentric pin so that to said inner cylinder which rotates with said hollow cylinder a rapid reciprocating movement is communicated so that said fingers circulate in said apertures and knead and shape the dough portions held in said apertures.

4. A dough cutting, kneading and shaping machine, comprising in combination a horizontal hollow cylinder having apertures in its circumference which are displaced the one with regard to the others, a central shaft in said hollow cylinder, a cylinder loosely mounted on said shaft and designed to cover said apertures from the inner side, fingers on said inner cylinder engaging each into one of the apertures of said hollow cylinder, means for slowly rotating said hollow cylinder, a bevel wheel on the inner end of said shaft, a bevel wheel meshing with said first mentioned bevel wheel, an axle of said second mentioned bevel wheel perpendicular to said shaft, a flanged disk at the top end of said axle, a pin eccentrically fixed in and upwardly projecting from said flanged disk, a sleeve forming the hub of said inner cylinder, a horizontal stud eccentrically fixed in and projecting from said sleeve at both ends, an arm fixed to the one end of said stud and having a lug engaging over said eccentric pin, an arm fixed to the other end of said stud and downwardly curved at its free end which forms a fork, an eccentric element keyed on said shaft and embraced by said fork-shaped end so that to said inner cylinder which rotates with said hollow cylinder a rapid reciprocating movement is communicated of such a kind that said fingers execute an oval movement in said apertures and knead and shape the dough portions held in said apertures.

5. A dough cutting, kneading and shaping machine, comprising in combination a horizontal hollow cylinder having apertures in its circumference which are displaced the one with regard to the other, a cylinder in said hollow cylinder designed to cover said apertures from the inner side, fingers on said inner cylinder engaging each into one of the apertures of said hollow cylinder, means for slowly rotating said hollow cylinder, and means for communicating to said inner cylinder which rotates with said hollow cylinder a rapid reciprocating movement so that said fingers circulate in said apertures and knead and shape the dough portions held in said apertures, an endless band enclosing said hollow cylinder, and means for guiding said endless band so that it covers that portion of the circumference of said hollow cylinder which begins to descend at the rotation of said cylinder so that the dough portions are securely held in the apertures of said hollow cylinder.

6. A dough cutting, kneading and shaping machine, comprising in combination a horizontal hollow cylinder having apertures in its circumference which are displaced the one with regard to the other, a cylinder in said hollow cylinder designed to cover said apertures from the inner side, fingers on said inner cylinder engaging each into one of the apertures of said hollow cylinder, means for slowly rotating said hollow cylinder, and means for communicating to said inner cylinder which rotates with said hollow cylinder a rapid reciprocating movement so that said fingers circulate in said apertures and knead and shape the dough portions held in said apertures, an endless band enclosing said hollow cylinder, guide pulleys for guiding said endless band so that it covers that portion of the circumference of said hollow cylinder which begins to descend at the rotation of said cylinder so that the dough portions are securely held in the apertures of said hollow cylinder, and a stretching device on that guide pulley which stands opposite the portion of said conveying band which is in contact with said cylinder so that an elastic contact is ensured.

In testimony whereof I affix my signature.

RICHARD SCHOLZ.